United States Patent [19]
Hata

[11] Patent Number: 5,242,171
[45] Date of Patent: Sep. 7, 1993

[54] GAME CARDS FOR PLAYING A GAME AND FOR LEARNING ARITHMETIC

[75] Inventor: Hidefumi Hata, Ichihara, Japan

[73] Assignee: Good Game Limited Responsibility Company, Ichihara, Japan

[21] Appl. No.: 817,930

[22] Filed: Jan. 6, 1992

[51] Int. Cl.$^5$ ............................ A63F 1/00; G09B 1/16
[52] U.S. Cl. .................................... 273/292; 273/299; 434/207; 434/209; 434/191
[58] Field of Search ............... 273/299, 302, 272, 292; 434/207, 209, 191

[56] References Cited

U.S. PATENT DOCUMENTS

| | | | |
|---|---|---|---|
| 1,485,146 | 2/1924 | Mundell | 273/299 |
| 2,562,633 | 7/1951 | Needham | 434/191 |
| 2,769,640 | 11/1956 | Elder | 434/209 |
| 2,901,839 | 9/1959 | Huff | 434/209 |
| 4,005,867 | 2/1977 | Yaeger | 273/236 |
| 4,807,885 | 2/1989 | Chamblee et al. | 273/292 |

Primary Examiner—Benjamin H. Layno
Attorney, Agent, or Firm—Michael N. Meller

[57] ABSTRACT

A set of game cards includes a plurality of first cards respectively indicating each number from 1 to 9, and a plurality of second cards each indicating a figure generated by multiplying together figures, respectively indicated on arbitrary first cards. Thus, the game cards help players learn multiplication tables when they are used.

3 Claims, 6 Drawing Sheets

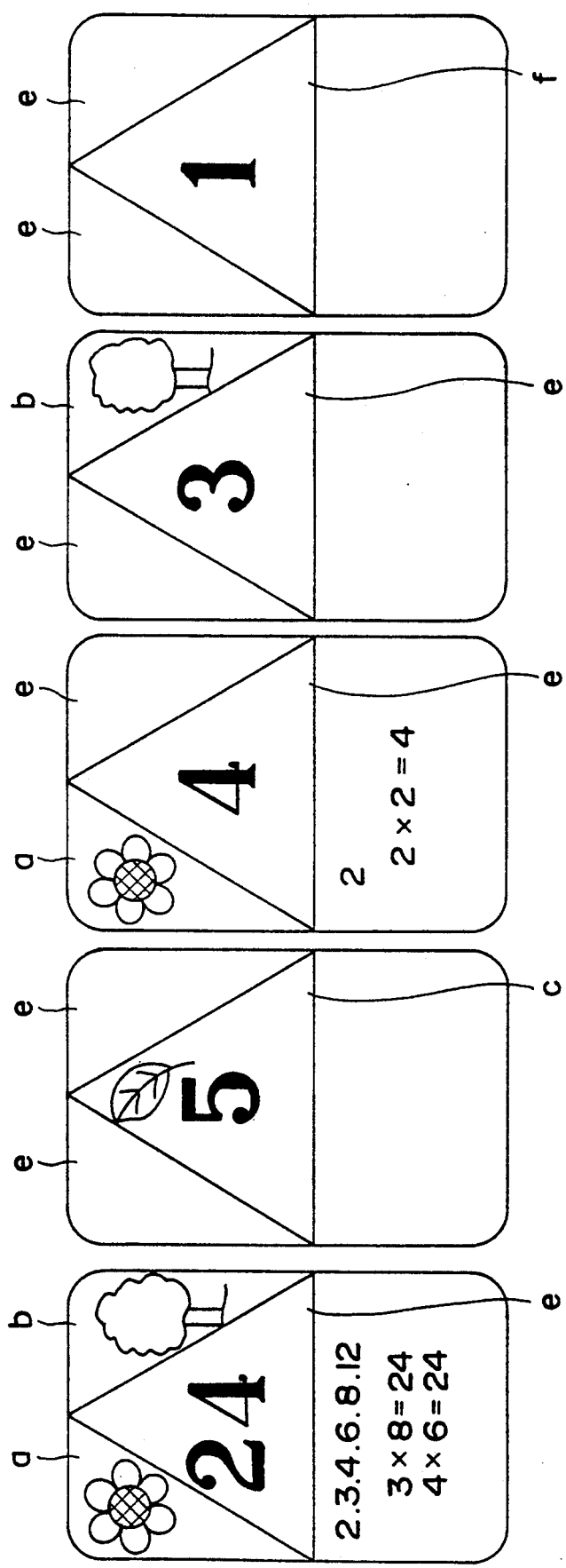

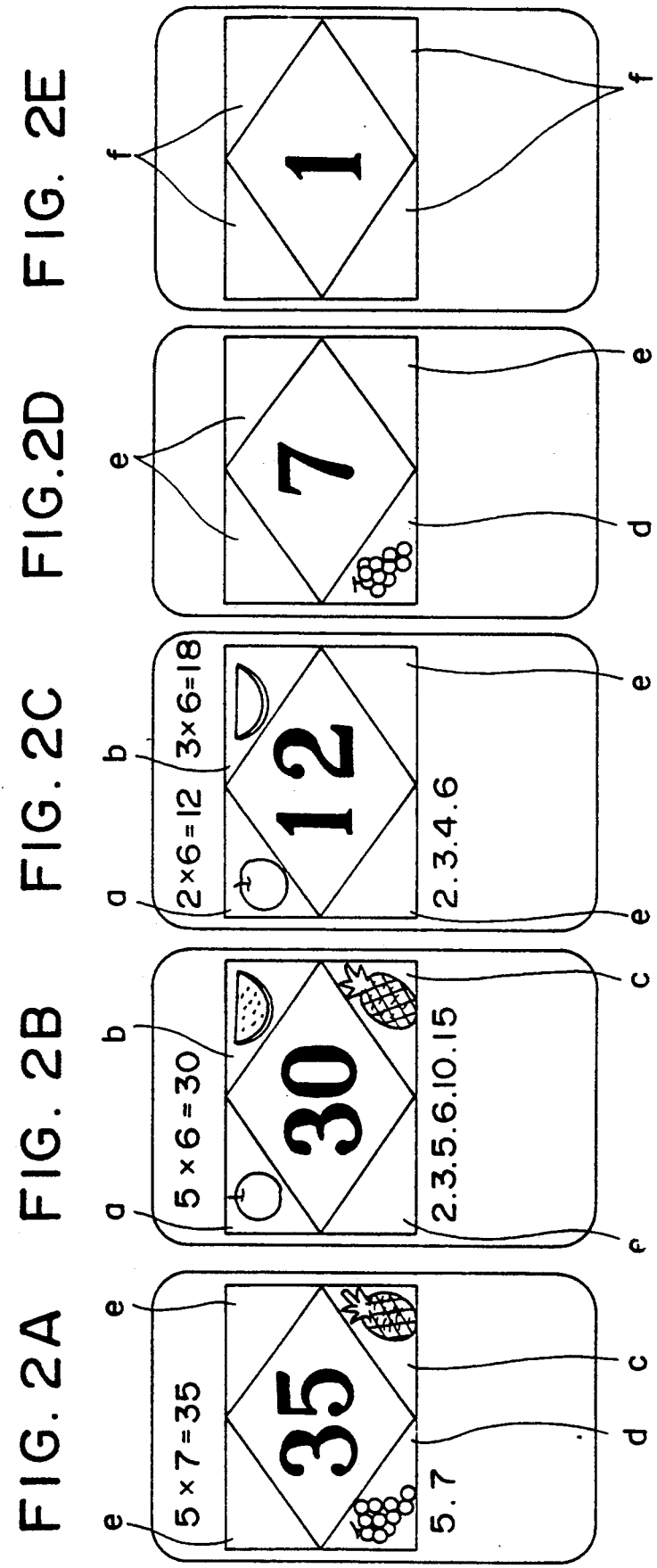

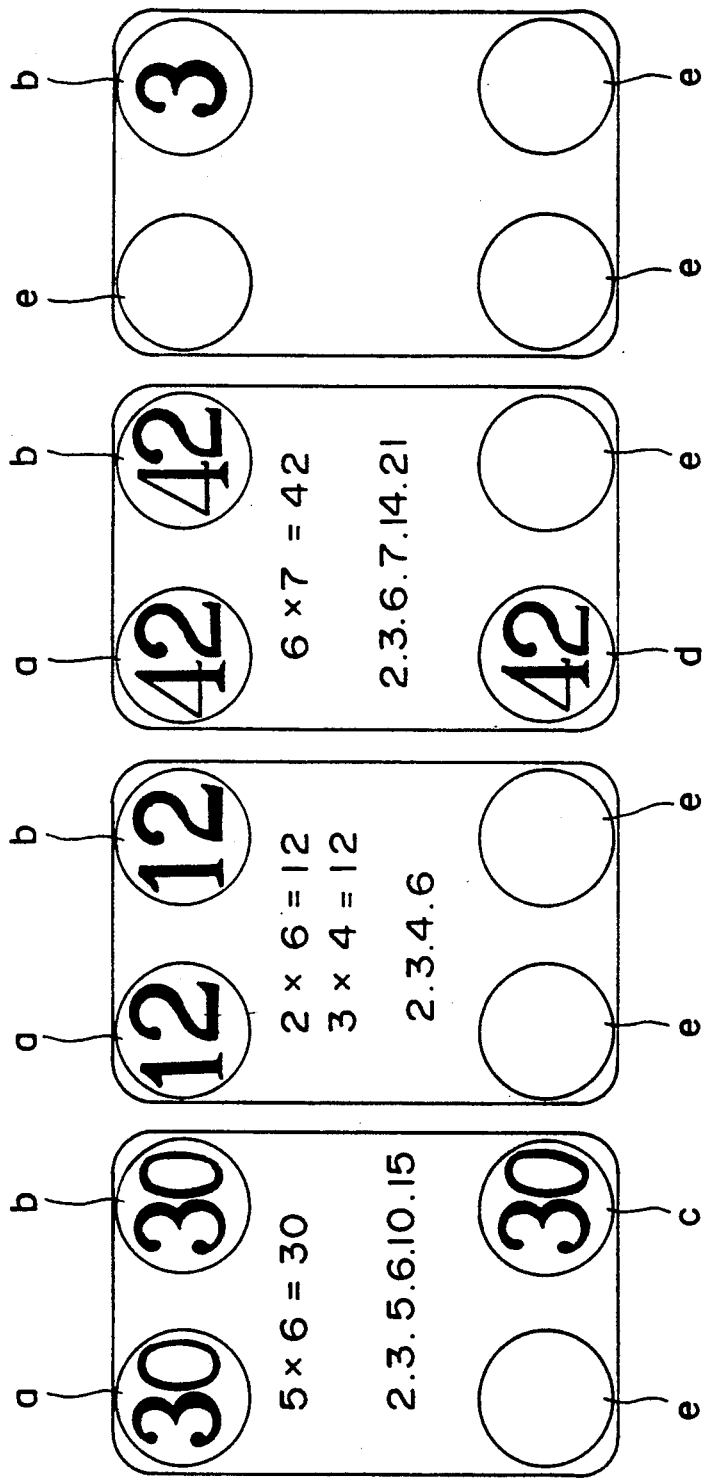

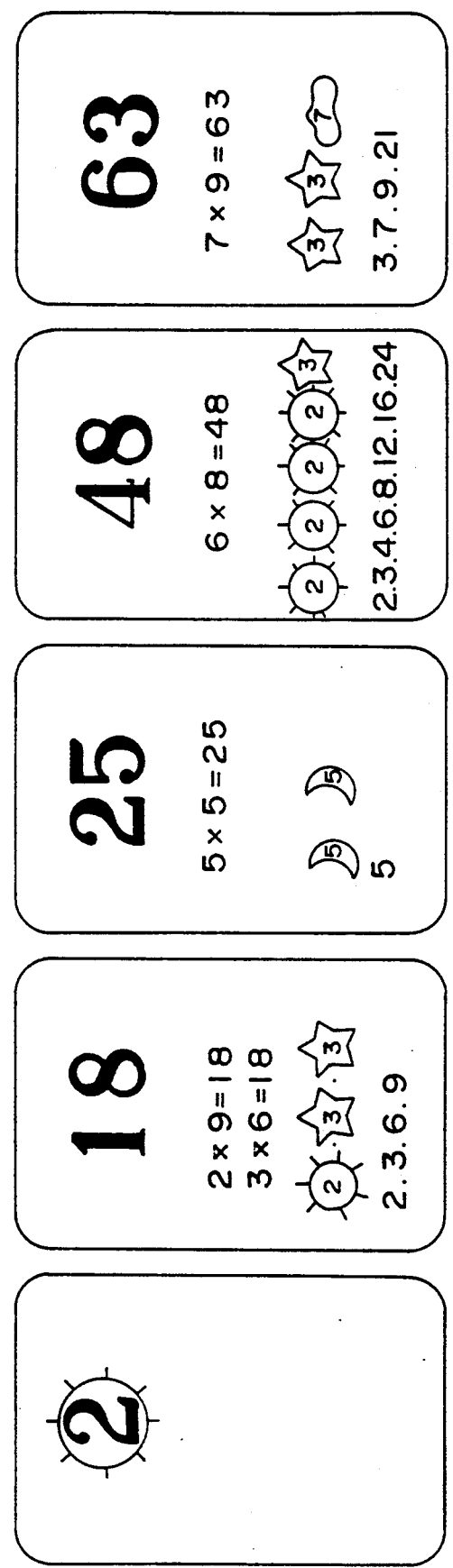

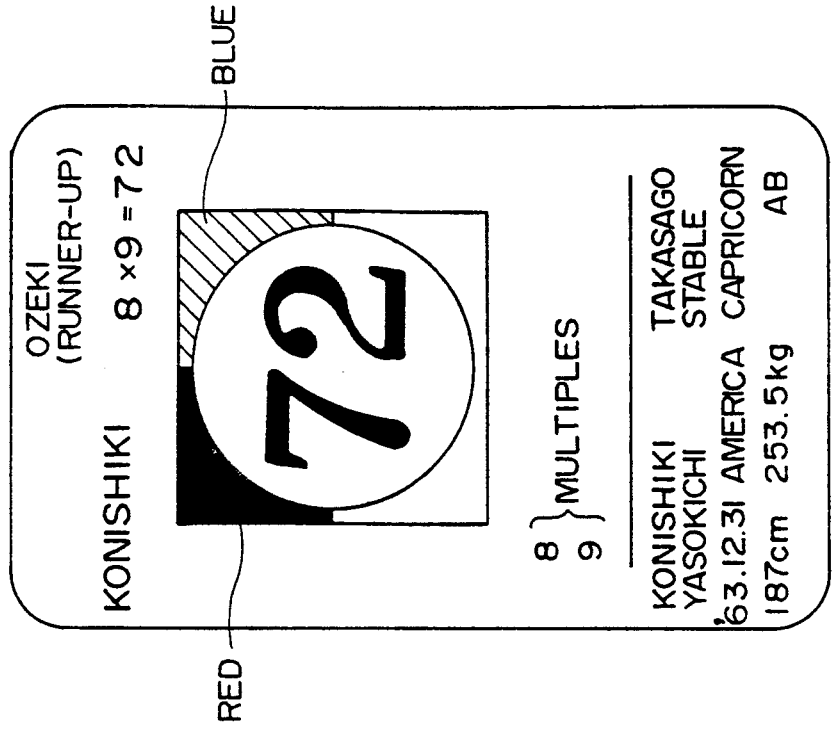
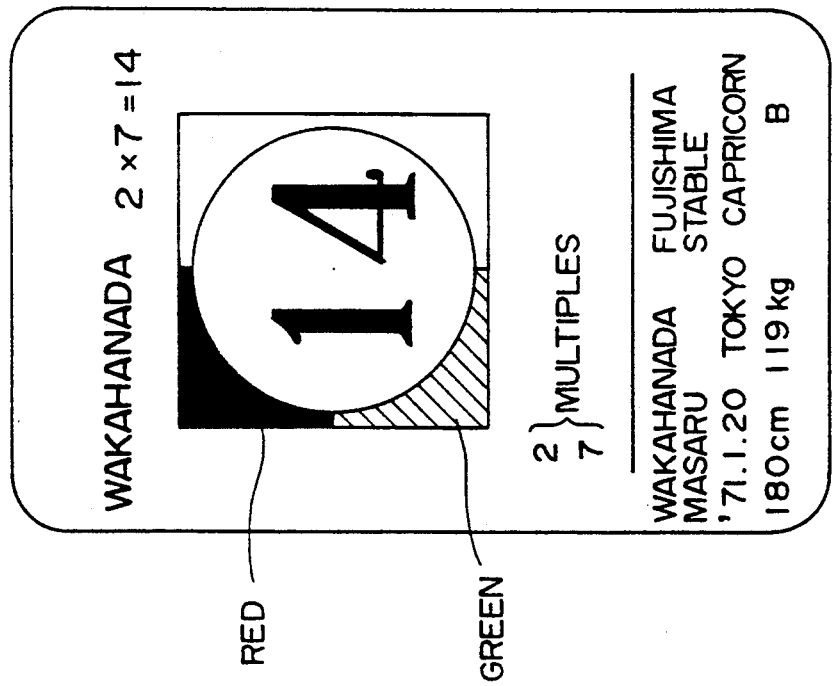

FIG. 6A

PLAYER A--DEALER

PLAYER B

▨ ▨ ▨
▨ ▨ ▨

PLAYER C

FIG. 6B

B - O  　　　 PLAYER B WINS
.. .. .. .. ..
　O 　O 　x
|81| |8| |40|

|36| |64| |2|
　x 　x 　O
.. .. .. .. ..
C - x  　　　 PLAYER C LOSES

FIG. 6C

PLAYER A

▨ ▨ ▨
C
▨ ▨ ▨  　　SURVIVOR TEAM

PLAYER B

FIG. 6D

A - O  　　　 PLAYER A WINS
.. .. .. .. ..
　O 　O 　x
|4| |1| |5|

|40| |81| |8|
　x 　x 　O
.. .. .. .. ..
B - x  　　　 PLAYE B LOSES

GAME CARDS FOR PLAYING A GAME AND FOR LEARNING ARITHMETIC

BACKGROUND OF THE INVENTION

The present invention relates generally to sets of game cards, and more particularly to a set of game cards used for various novel games and which contributes to learning arithmetic.

Conventional playing cards are well known as game cards each having a figure thereon; These playing cards comprise four suits of cards having the successive figures 1 to 13 thereon. Although there are some well known games in which the winner thereof is determined in accordance with the suit of a card or a specific combination of numbers, no arithmetic knowledge, except for judging which figure is larger (or smaller), is needed. That is, no card game helps players learn aspects of arithmetic of such as the multiplication tables, divisors, multiples, and the four rules of arithmetic. In addition, as each of the playing cards has a standard design, it is difficult to diversify card games by playing games based on the sense of sight. Moreover, there are many card games which are too difficult for small children to play.

SUMMARY OF THE INVENTION

Accordingly, it is a general object of the present invention to provide a set of novel and useful game cards in which the above disadvantages are eliminated.

Another, more specific object of the present invention is to provide a set of game cards, used for various novel games, which anyone from a small child to an adult can use and which helps players understand aspects of arithmetic, such as multiplication tables, divisors and multiples.

According to one feature of the present invention, a set of game cards comprises a plurality of first cards each indicating a figure from 1 to 9, and a plurality of second cards, each indicating a figure generated by multiplying together figures, respectively indicated on arbitrary first cards.

Another feature of the present invention, a set of game cards comprises a plurality of first cards each indicating a figure from 1 to 12, and a plurality of second cards, each indicating a figure generated by multiplying together two figures, respectively indicated on arbitrary first cards.

According to the present invention, since the figure indicated on each of the second cards is generated by multiplying together figures indicated on the first cards, the game cards help players learn multiplication tables when they are used. Incidentally, the game cards further help players learn multiples, divisors, and the four rules of arithmetic if divisors and multiples of a figure are indicated visually on each card.

Other objects and further features of the present invention will become apparent from the following detailed description of the preferred embodiments when read in conjunction with the accompanying drawings.

BRIEF DESCRIPTION OF THE DRAWINGS

FIGS. 1A to 1E show a design of game cards of a first embodiment according to the present invention;

FIGS. 2A to 2E show a design of game cards of a second embodiment according to the present invention;

FIGS. 3A to 1D show a design of game cards of a third embodiment according to the present invention;

FIGS. 4A to 4E show a design of game cards of a fourth embodiment according to the present invention;

FIGS. 5A and 5B a design of game cards of a fifth embodiment according to the present invention; and FIGS. 6A to 6D show views for explaining an example of a game which uses the game cards according to the present invention.

DETAILED DESCRIPTION OF THE PREFERRED EMBODIMENTS

A set of game cards according to the present invention (referred to as a set of multiplication cards hereinafter) comprises two types of cards, 18 cards indicating numbers from 1 to 9 (each number from 1 to 9 being indicated on two cards), and 27 cards each indicating a number from 10 to 81 which is an answer of the multiplication tables of 1*1 to 9*9. Thus, the set of multiplication cards comprises total 45 cards.

Inclusion of the number 1 in the multiplication cards is optional. In addition, the multiplication cards may include cards, indicating the numbers from 1 to 9, in which each number is indicated on only one card or on more than three cards. Moreover, the multiplication cards may include cards indicating the numbers from 1 to 9, in which a specific number, for example, 2, 3, 5 and/or 7, is indicated on one card or more than three cards. Furthermore, the multiplication cards may include cards, indicating numbers from 10 to 81, in which each number is indicated on more than two cards, or in which a specific number is indicated on more than two cards. The multiplication cards may comprise cards indicating each of the numbers from 10 to 144 which is an answer in the multiplication tables from 1*1 to 12*12. In addition, some prime factors greater than 10 may be indicated on the multiplication cards. Further, a card indicating 0 may be included. Therefore, three cards respectively indicating 0 may be added to the above 45 cards so that the set of multiplication cards comprise total 48 cards.

In the multiplication cards of the first embodiment according to the present invention, as shown in FIGS. 1A to 1E, cards indicating multiples of 2, 3 and/or can be discriminated visually by pictures, since "2, 3 or 5" are prime factors of most numbers. One can recognize, at a glance, whether the card has a multiple of 2, 3 or 5. As shown in FIGS. 1A to 1E, each number is indicated at the center of the card. A flower is indicated on the upper left side of cards indicating a multiple of 2. A tree is indicated on the upper right side of cards indicating a multiple of 3. A leaf is indicated at the center of cards indicating a multiple of 5. Incidentally, each card may include pictures having no designated location. These simple pictures, such as a flower, a tree or a leaf, help children understand the cards. In addition, cards which are multiples of 2, 3 and/or 5 may be discriminated by color, for example, in FIGS. 1A to 1F, red for "a", blue for "b", yellow for "c", white for "e", and brown for "f".

On each of the multiplication cards of the first embodiment according to the present invention, divisors are indicated (except 1 and the number itself), as shown in FIGS. 1A to 1E. For example, although the number 24 shown in FIG. 1A has divisors: 1, 2, 3, 4, 6, 8, 12, and 24, only 2, 3, 4, 6, 8, and 12 are indicated. Thus, the multiplication cards assist in learning of divisors. Incidentally, 1 and the number itself may be optionally indicated on each card.

On each of the multiplication cards of the first embodiment according to the present invention, the number is indicated, as shown in FIGS. 1A to 1E, by equations in accordance with the multiplication tables. For example, although the number 24 shown in FIG. 1A. can be indicated by the multiplication equations of 1*24, 2*12, 3*8, 4*6, 6*4, 8*3, 12*2, and 24*1, only multiplication equations constructed with the numbers from 2 to 9 (3*8 and 4*6) are indicated. Thus, the multiplication cards help players learn the multiplication tables and multiples. The reasons the multiplication equations 1*24, 2*12, 6*4, 8*3, 12*2 and 24*1 are not indicated are space restriction, design of the card, and adhesion to the option to exclude 1 and the number itself as divisors. Alternatively, the multiplication cards may include 1*24 and 2*12, etc.

In the multiplication cards of the second embodiment according to the present invention, as shown in FIGS. 2A to 2E, cards indicating multiples of 2, 3, 5 and/or 7 can be visually discriminated, by pictures, since "2, 3, 5 and 7" are all the prime factors among the numbers from 2 to 9. Thus, one can recognize at a glance whether the cards are multiples of 2, 3, 5 and/or 7. As shown in FIGS. 2A to 2E, each number is indicated at the center of the card. An apple is indicated on the upper left side of cards indicating a multiple of 2. A watermelon is indicated on the upper right side of cards indicating a multiple of 3. A pineapple is indicated at the lower right side of cards indicating a multiple of 5. Grapes are indicated on the lower left side of cards indicating a multiple of 7. These simple pictures, such as the apple, watermelon, pineapple and grapes help infants understand the card. Incidentally, cards which are multiples of 2, 3, 5, and/or 7 may be discriminated by color, for example in FIGS. 2A to 2E, red for "a", blue for "b", yellow for "c", green for "d", white for "e", and brown for "f".

The multiplication cards of the second embodiment according to the present invention differ from those of the first embodiment in the location of the number.

In the multiplication cards of the third embodiment according to the present invention, as shown in FIGS. 3A to 3D, cards indicating multiples of 2, 3, 5 and/or 7 can be visually discriminated by the arrangement of the numbers. As shown in FIGS. 3A to 3D, numbers which are multiples of 2 are indicated on the upper left side of the cards. Numbers which are multiples of 3 are indicated on the upper right side of the cards. Numbers which are multiples of 5 are indicated on the lower right side of the cards. Numbers which are multiples of 7 are indicated on the lower left side of the cards. Incidentally, cards which are multiples of 2, 3, 5, and/or 7 may also be discriminated by color, for example, red for "a", blue for "b", yellow for "c", green for "d", white for "e", and brown for "f". In addition, the number 1 may be indicated at the center of a card. Multiplication equations and divisors are indicated on the card as in the first and second embodiments, and thus a description thereof will be omitted.

In the multiplication cards of the fourth embodiment according to the present invention, as shown in FIGS. 3A to 3D, cards indicating multiples of 2, 3, 5 and/or 7 can be visually discriminated by pictures and prime factor division. As shown in FIGS. 4A to 4E, a card indicating a multiple of 2 has the number 2 within a sun. A card indicating a multiple of 3 has the number 3 within a star. A card indicating a multiple of 5 has the number 5 within a moon. A card indicating a multiple of 7 has the number 7 within a cloud. Each picture is expressed as a prime factor. For example, since the number 18 is divided into prime factors 2*3*3, the card has these factors indicated thereon as shown in FIG. 4B. Incidentally, cards indicating multiples of 2, 3, 5, and/or 7 may be discriminated by color, for example, red for a sun, blue for a star, yellow for a moon, and gray for a cloud. A part of the multiplication table and divisors are indicated on the card as in the first and second embodiments, and thus a description thereof will be omitted.

According to the present invention, each card has an approximately rectangular shape of 5.1 cm×7.2 cm, but other sizes and shapes may be used for the multiplication cards.

As shown in FIGS. 5A and 5B, each figure may be combined with a sumo wrestler. If a figure is combined with a sports player, racing horse, car, or a comic character, etc., children pay more attention to the cards and thus learn the multiplication tables.

A description will now be given of examples of games using the multiplication cards. Many games using the multiplication cards determine which card is stronger or weaker in accordance with either a multiplication basic rule or multiplication junior basic rule. In most games, a dealer is selected first, and he/she then shuffles the cards and deals the cards. The player at the left of the dealer is the first to play; play continues in a clockwise manner. It is to be noted that like most other game cards, the reverse side of each card included in the multiplication cards has a standard design and color so that the players can not recognize the figure displayed on the obverse side by seeing the reverse side.

The multiplication basic rule, generally intended for children in grades 4, 5 and 6, is as follows:

1. Imagine two numbers M and N; if M is a divisor of N, M is considered to defeat N; excluded from the divisor of N are 1 and N. Therefore, 9 defeats 81;

2. Imagine two numbers M and N; if the above condition "1" is not satisfied, and if M is larger than N, M is considered to defeat N. Therefore, 10 defeats 9;

3. Imagine two numbers M and N; if M is equal to N, there is considered to be a tie, or both cards are considered to be defeated in a game where both cards are shown at the same time, or the latter card defeats the former card in a game where each card is shown in turn; and 4. 1 is considered to defeat 81, but is defeated by other figures.

The multiplication junior basic rule, generally intended for children in grades 1, 2 and 3 of elementary school, is as follows:

1. Imagine two numbers M and N; if M is more than 2 but less than 9, a divisor of N, and N/M is more than 2 but less than 9, M is considered to defeat N; excluded from the divisor of N are 1 and N. Therefore, 9 defeats 72;

2. Imagine two numbers M and N; if the above condition "1" is not satisfied, and if M is larger than N, M is considered to defeat N. Therefore, 10 defeats 9. 72 defeats 12;

3. Imagine two numbers M and N; if M is equal to N, there is considered to be a tie, or both cards are considered to be defeated in a game where both cards are shown at the same time, or the latter card defeats the former card in a game where each card is shown in turn; and 4. 1 is considered to defeat 81, but is defeated by other figures.

Next, a description will be given of representative and elementary games using the multiplication cards.

1. CARD EXPOSURE

A. Number of Players—2 to several
B. Number of multiplication cards to be used—45
C. Game Rules A dealer shuffles the multiplication cards and then places them together in a pile at a central spot. If all the cards are exposed, the game ends.

1) If a player exposes a card indicating a multiple of 5, he/she puts down all of his/her cards.

2) If a player exposes a card with 72, he/she takes possession of this and everyone else's cards.

3) If a player exposes a card indicating a multiple of 6, he/she takes possession of all the exposed cards on the central spot (referred to as the spot hereinafter).

4) If a player exposes a card indicating a multiple of 3 or 9, he/she takes possession of only the card from the spot.

5) If a player exposes a card with 1, he/she takes possession of all the cards of his/her right side neighbor.

6) If an exposed card does not satisfy all the above items, it is left at the spot. All of the exposed cards at the spot are piled together. When an exposed card satisfies more than two of the above items, it is dealt in accordance with the lowest item. The player who possesses the largest number of cards wins the game.

D. Suitable for learning the multiplication tables. Other multiples instead of 5 or 6 may be used.

2. MULTIPLICATION EQUATION

A. Number of Players—preferably 4 or 5
B. Number of multiplication cards to be used—45
C. Game Rules The multiplication cards are divided into cards with 1 to 9 (two each) and cards with 10 to 81. The cards with 1 to 9 are shuffled and placed face down in a pile at the spot. The cards with 10 to 81 are dealt to each player so that each player has the same number of cards (three players each having nine cards, four players each having six cards, five players each having five cards, and six players each having four cards).

A dealer exposes two cards. Anyone can discard cards indicating an answer to the multiplication equation of the exposed two cards. The next person discards one card from among the two cards and leaves one card at the spot, and then exposes one card from the pile. Likewise, anyone can throw away his/her card with a figure which is an answer to the multiplication equation of the exposed two cards. Two cards are always exposed at the spot.

A player who exposes a card with 1 can discard any one card.

The player who discard all of his/her cards first wins.

D. Suitable for learning the multiplication tables.

3. MULTIPLICATION WAR

A. Number of Players—2 to several
B. Number of multiplication cards to be used—45
C. Game Rules Cards are dealt out until finished, and each player has almost the same number of cards; the cards are arranged face down, in a pile, by each player. Each player simultaneously puts down the uppermost card from his/her pile. Which card is stronger or weaker is based on the multiplication junior rule. The winner takes possession of the card put down by him/her and that put down by the defeated person.

1) For Two Players

If a winner wins in accordance with a divisor relation defined in the multiplication junior rule, he/she gets extra cards, from the defeated, as a bonus, to an extent corresponding to the number of the winning card (For example, if one puts down a card with 72 and the opponent puts down a card with 8, one must give the opponent 8 cards. If a winner wins in accordance with the number, he/she gets no bonus. The winner piles cards taken from the defeated together with the card put down by himself/herself, and then adds them to his/her cards. If there is a tie, a tie-breaking match is held. The winner of the tie-breaker takes all the cards used for the tie-breaker and, for the former match which concluded in the tie.

2) For Three Players

If a winner wins in accordance with the divisor relation, he/she gets extra cards. The winner gets all cards at the spot in addition to a bonus defined below. The winner gets, as a bonus, from the defeated (there can be a plurality of defeated players), a number of cards corresponding to the number indicated of the winning card. For example, if cards with 45, 27, 6, and 3 are put down on the spot, the player who put the card with 3 is the winner, and the players who put the cards with 27 and 6 must each put down three cards. The winner takes possession of all the cards put down to add them under the lowermost card in his/her pile.

Incidentally, if two divisor relations occur, the card with the largest divisor wins. For example, if cards with 30, 27, 6, and 3 are put down on the spot, from among the winning card with 6 for the card with 30 and the winning card with 3 for the card with 27, the winning card with 6 wins. Therefore, the player who put down the card with 30 must put down six more cards on the spot. The player who put down the card with 6 takes all the cards put down on the spot.

If a winner wins in accordance with the number, he/she gets no bonus. The player who put down the card with the largest number takes possession of all the cards put down by all defeated players. If a card with 1 and a card with 81 are simultaneously put down, the player who put down the card with 1 always wins even if there is also a divisor relation. However, the winner gets no bonus.

Two winners who put down the same cards must play off to determine a winner. This winner takes possession of all the cards used including those used for the play-off.

When one player collects 45 cards, the game ends. However, the game may be terminated when only two players remain, and then the ranking may be determined by the number of cards possessed.

D. Suitable for learning divisors, multiplication tables, and easy division.

4. GREAT WAR

A. Number of Players—2 to several
B. Number of multiplication cards to be used—45
C. Game Rules The great war is different from the multiplication war in that the multiplication basic rule supercedes the multiplication junior basic rule. A maximum of 36 cards can be given as a bonus (in a case where the card with 72 and the card with 36 are put down.). A winner cannot get a complete bonus from the defeated player if the defeated player lacks sufficient of cards.

D. Suitable for learning divisors, multiplication tables, and division of two figures.

5 THREE SURVIVORS

A. Number of players—2 to 5

B. Number of multiplication cards to be used:

A dealer is selected who deals cards, and makes a plurality of groups, each comprising three down-faced cards. The number of groups and cards to be used changes in accordance with the number of players. Each player examines his/her own groups, group by group, and then places each card facing down. Each group must remain separate.

42 cards excluding those with 1 and 81 are used for a two-player match; each player has seven groups. 45 cards are used for a three-player match; each player has five groups. 45 cards are used for a four-player match; the dealer has three groups and the other players each have four groups. 45 cards are used for a five-player match; each player has three groups.

C. Game Rules

The multiplication basic rule governs the game; two cards having the same number, fight against each other, are considered to be both defeated. Alternatively, the multiplication junior basic rule may be used.

Each player examines the characteristics of his/her own groups. Incidentally, cards cannot be exchanged between groups. Two neighbors on the left side of the dealer go against each other first. Each of the two neighbors selects one group from among his/her groups, places three cards facing down, as shown in FIG. 6A, and arranges them each opposite the opponent's three cards. Each card fights against the opposite card, and the group having more than two winning cards wins, as shown in FIG. 6B. The winner takes possession of the defeated one's group of cards, piles together and exposes them, in order to keep track of his/her own down-faced group. The winning group survives, to participate in subsequent next games with another left side neighbor. The three cards in the winning group are exposed while the other left side neighbor is selecting a group. When the other left side neighbor selects a group, the player of the winning group turns over the cards of the winning group, shuffles them, and likewise plays, as shown in FIGS. 6C and 6D. When both groups are defeated, each player takes possession of the opponent's cards and adds them to his/her score. A next player and a player next to the next player select their teams and play with the teams. If only one player has a group to fight, the game is terminated, and the score is calculated: 1 point for each defeated group, and 2 points for each winning group. Rank is determined in accordance with the total of points. A pocker chip may be used to denote a point. A top reward may be provided.

D. Suitable for learning the multiplication tables, divisors, and division.

Thus, the multiplication cards can be used for various novel games, which anyone from small children to adults can play. In addition, a player can cultivate his/her arithmetic knowledge of multiplication tables, divisors, multiples, etc.

Further, the present invention is not limited to these preferred embodiments, and variations and modifications may be made without departing from the scope of the present invention.

What is claimed is:

1. A set of game cards comprising:
   a plurality of first cards respectively indicating a figure from 1 to 9; and
   a plurality of second cards each indicating a figure generated by multiplying together figures, respectively indicated on two arbitrary first cards,
   each card of said first and second cards indicates a figure and divisors corresponding to the figure, which divisors exclude 1 and the figure itself.

2. A set of game cards comprising:
   a plurality of first cards respectively indicating a figure from 1 to 9; and
   a plurality of second cards each indicating a figure generated by multiplying together figures, respectively indicated on two arbitrary first cards,
   each card of said first and second cards indicates a figure and prime factors of the figure.

3. A set of game cards according to claim 2, wherein 2, 3, 5, and 7 from among the prime factors are visually discriminated by means of a predetermined indication.

* * * * *